(12) United States Patent
Burisch et al.

(10) Patent No.: US 11,892,342 B2
(45) Date of Patent: Feb. 6, 2024

(54) MONOLITHIC WEIGHING CELL WITH BEARINGS FORMED BY ADDITIVE MANUFACTURING

(71) Applicant: Mettler-Toledo GmbH, Greifensee (CH)

(72) Inventors: Arne Burisch, Zürich (CH); Hans-Rudolf Burkhard, Wila (CH); Stephan Baltisberger, Gossau (CH); Urs Loher, Wohlenschwil (CH); Andreas Metzger, Männedorf (CH)

(73) Assignee: Mettler-Toledo GmbH, Greifensee (CH)

( * ) Notice: Subject to any disclaimer, the term of this patent is extended or adjusted under 35 U.S.C. 154(b) by 840 days.

(21) Appl. No.: 16/955,849

(22) PCT Filed: Dec. 14, 2018

(86) PCT No.: PCT/EP2018/084858
§ 371 (c)(1),
(2) Date: Jun. 19, 2020

(87) PCT Pub. No.: WO2019/121350
PCT Pub. Date: Jun. 27, 2019

(65) Prior Publication Data
US 2020/0340849 A1   Oct. 29, 2020

(30) Foreign Application Priority Data
Dec. 21, 2017   (EP) ..................................... 17209294

(51) Int. Cl.
*G01G 7/02*   (2006.01)
*B33Y 10/00*   (2015.01)
(Continued)

(52) U.S. Cl.
CPC ............. *G01G 7/02* (2013.01); *B23K 26/342* (2015.10); *B23K 26/70* (2015.10); *B33Y 10/00* (2014.12);
(Continued)

(58) Field of Classification Search
CPC ...... G01G 3/13; G01G 3/1412; G01G 3/1414; G01G 7/02; G01G 21/07; G01G 21/24;
(Continued)

(56) References Cited

U.S. PATENT DOCUMENTS 4,838,369 A * 6/1989 Albert .................... G01G 21/24
177/229
5,154,247 A * 10/1992 Nishimura ............ G01L 1/2287
177/229
(Continued)

*Primary Examiner* — Randy W Gibson
(74) *Attorney, Agent, or Firm* — STANDLEY LAW GROUP LLP; Jeffrey S. Standley; Adam J. Smith

(57) ABSTRACT

A parallel guide of a force transmission device has movable and fixed parallel legs, and first and second parallel guiding elements. Thin-point flexional bearings connect the parallel legs to the parallel guiding elements. The movable parallel leg is guided by the parallel guiding element on the fixed parallel leg. A force transmission lever, arranged on the fixed parallel leg, has a lever bearing, and a first lever arm. The force transmission lever is pivotably mounted on the lever bearing and the first lever arm is connected to the movable parallel leg to transmit force. The force-transmitting connection is produced by a coupling element having at least one further thin-point flexional bearing, with at least one functional region of the force transmission device being formed monolithically. A functional region associates at least one bearing point with at least one of the parallel legs, the force transmission lever, and the coupling element.

18 Claims, 8 Drawing Sheets

Figure 1A:
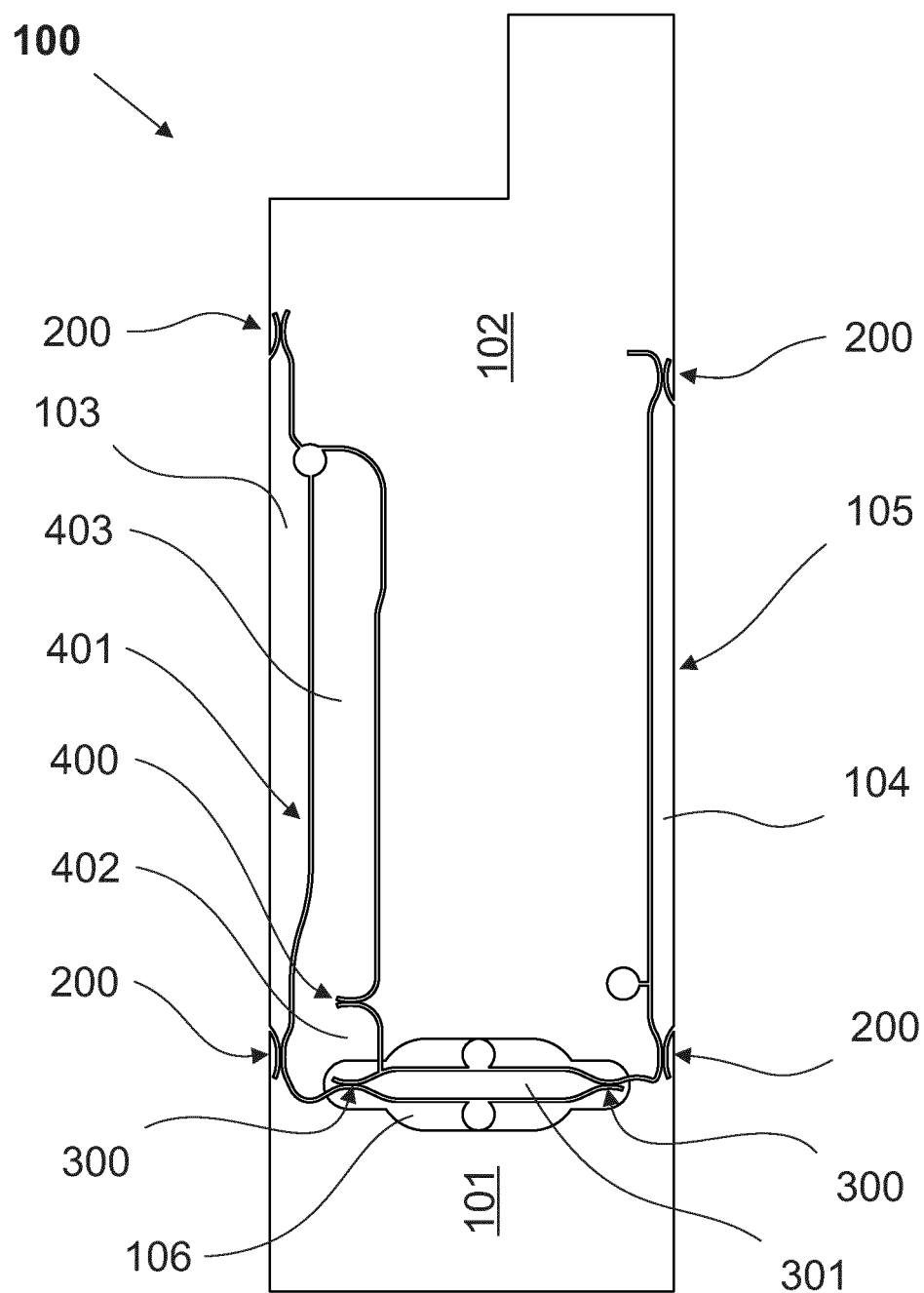

(51) Int. Cl.
| | |
|---|---|
| *B33Y 70/00* | (2020.01) |
| *B33Y 80/00* | (2015.01) |
| *B23K 26/34* | (2014.01) |
| *B23K 26/70* | (2014.01) |
| *G01G 21/24* | (2006.01) |
| *G01G 3/14* | (2006.01) |
| *G01L 1/26* | (2006.01) |
| *B23K 26/342* | (2014.01) |
| *G01G 21/07* | (2006.01) |
| *G01G 3/13* | (2006.01) |

(52) U.S. Cl.
CPC ............... *B33Y 70/00* (2014.12); *B33Y 80/00* (2014.12); *G01G 3/13* (2013.01); *G01G 21/07* (2013.01); *G01G 21/244* (2013.01); *G01G 3/1412* (2013.01); *G01G 3/1414* (2013.01); *G01L 1/26* (2013.01)

(58) Field of Classification Search
CPC ....... G01G 21/244; G01L 1/26; G01L 1/2243; G01L 9/0044; B33Y 10/00; B33Y 70/00; B33Y 80/00; B23K 26/342; B23K 26/70
See application file for complete search history.

(56) References Cited

U.S. PATENT DOCUMENTS

| | | | | |
|---|---|---|---|---|
| 5,247,840 | A * | 9/1993 | Klamt | G01L 1/26 73/862.636 |
| 5,340,951 | A | 8/1994 | Hungerbühler et al. | |
| 5,604,336 | A * | 2/1997 | Johnson | G01G 3/1412 177/229 |
| 5,641,948 | A * | 6/1997 | Burkhard | G01G 21/244 177/229 |
| 6,326,562 | B1 | 12/2001 | Burkhard et al. | |
| 6,409,845 | B1 | 6/2002 | Tellenbach | |
| 6,555,767 | B1 * | 4/2003 | Lockery | G01L 1/2206 177/229 |
| 7,345,249 | B2 * | 3/2008 | Burkhard | G01G 21/244 177/229 |
| 9,297,689 | B2 * | 3/2016 | Béguin | G01G 23/01 |
| 2021/0402480 | A1 * | 12/2021 | Sweetland | B33Y 30/00 |

* cited by examiner

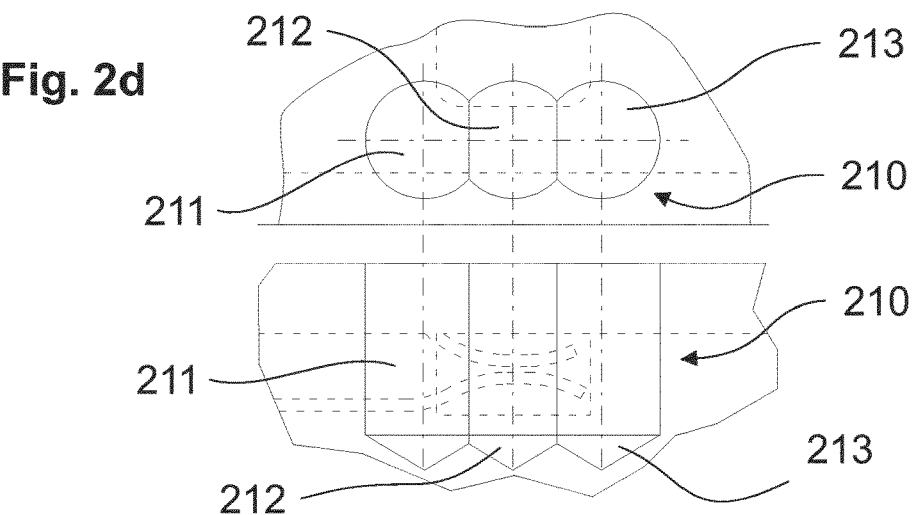
Fig. 2d
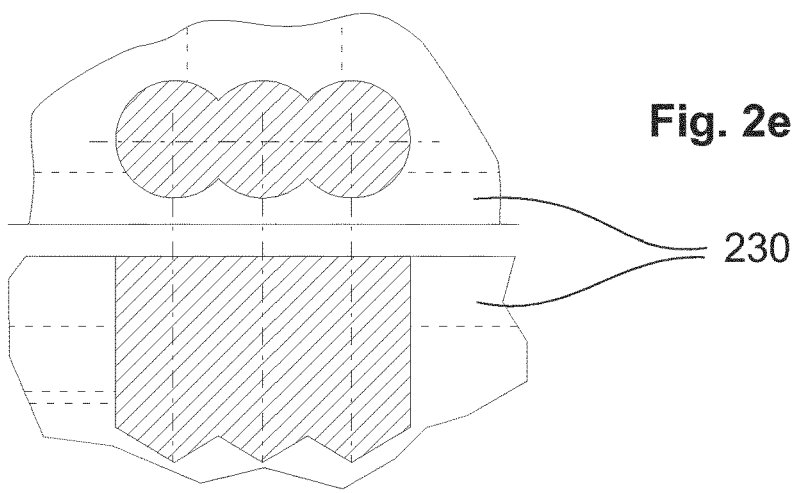
Fig. 2e
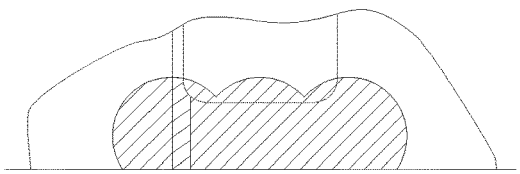
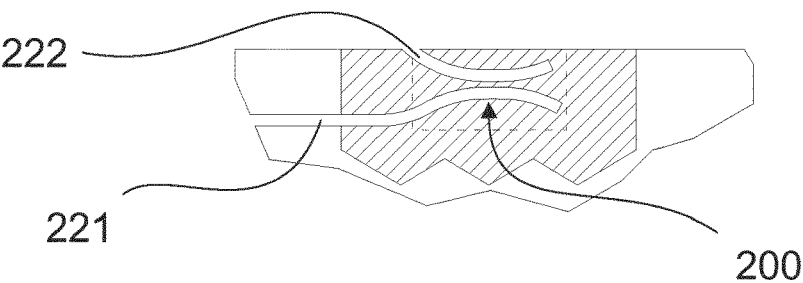
Fig. 2f

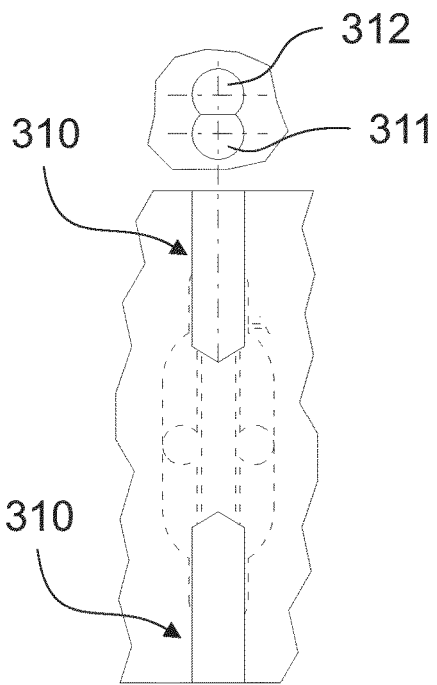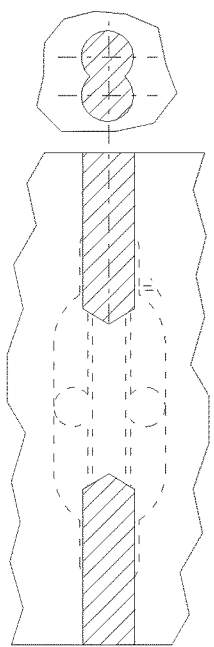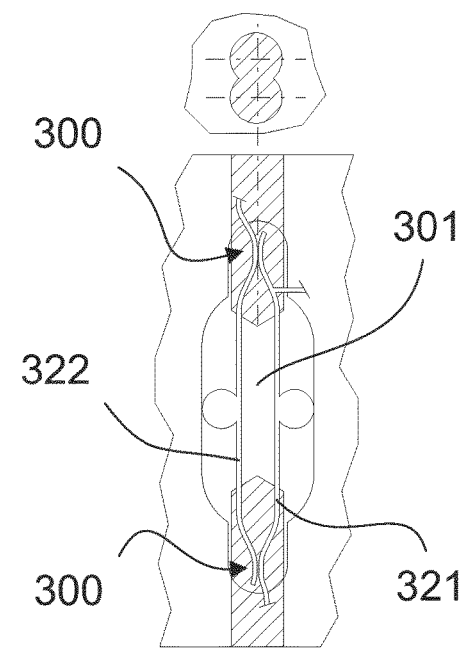
Fig. 3a   Fig. 3b   Fig. 3c
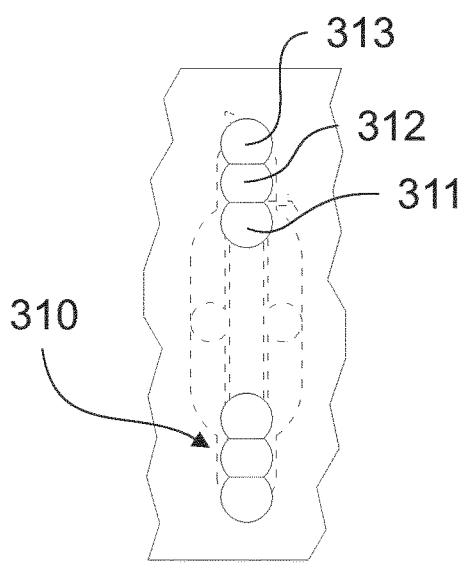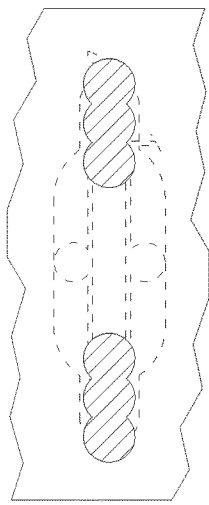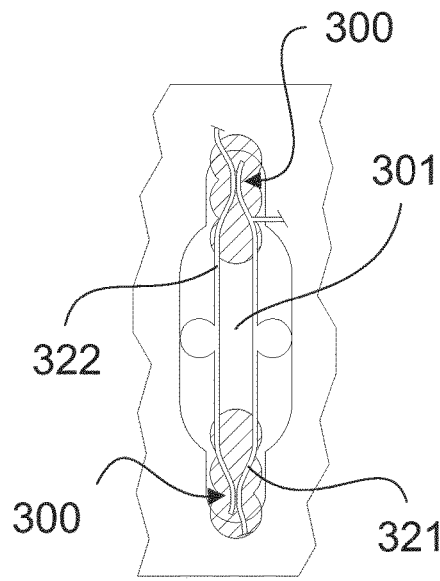
Fig. 3d   Fig. 3e   Fig. 3f

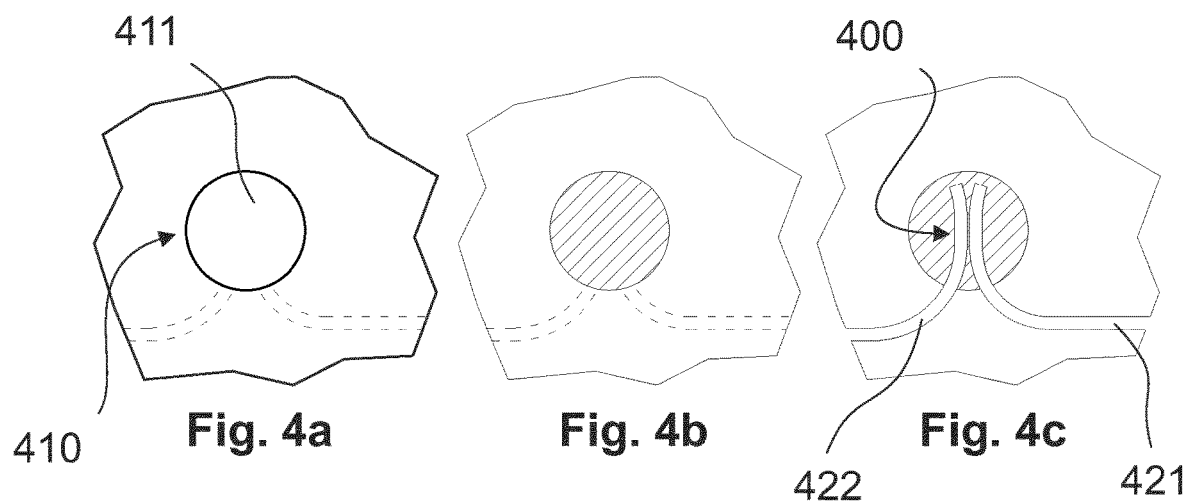
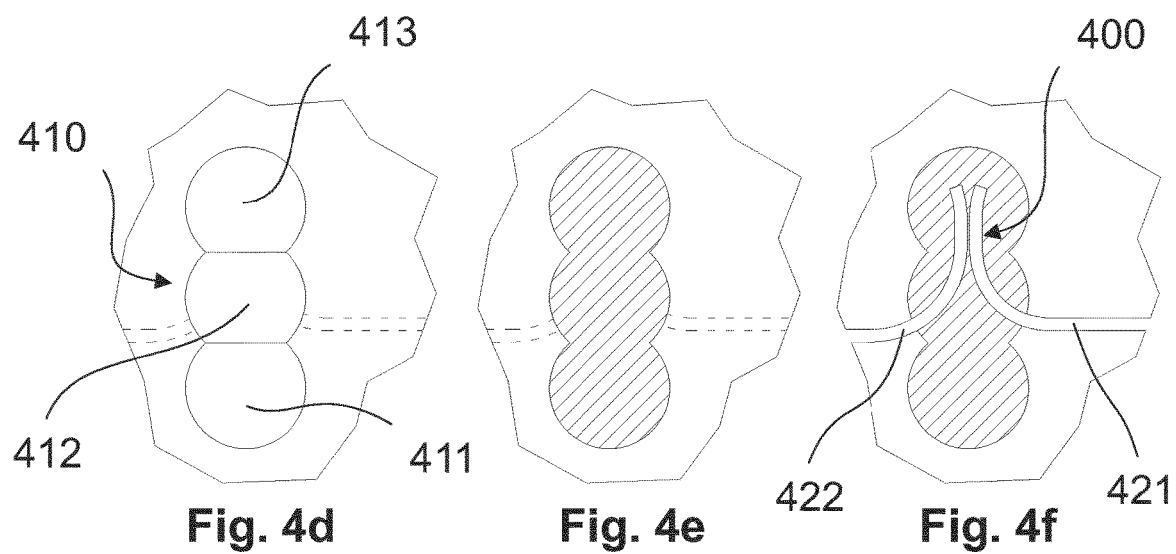
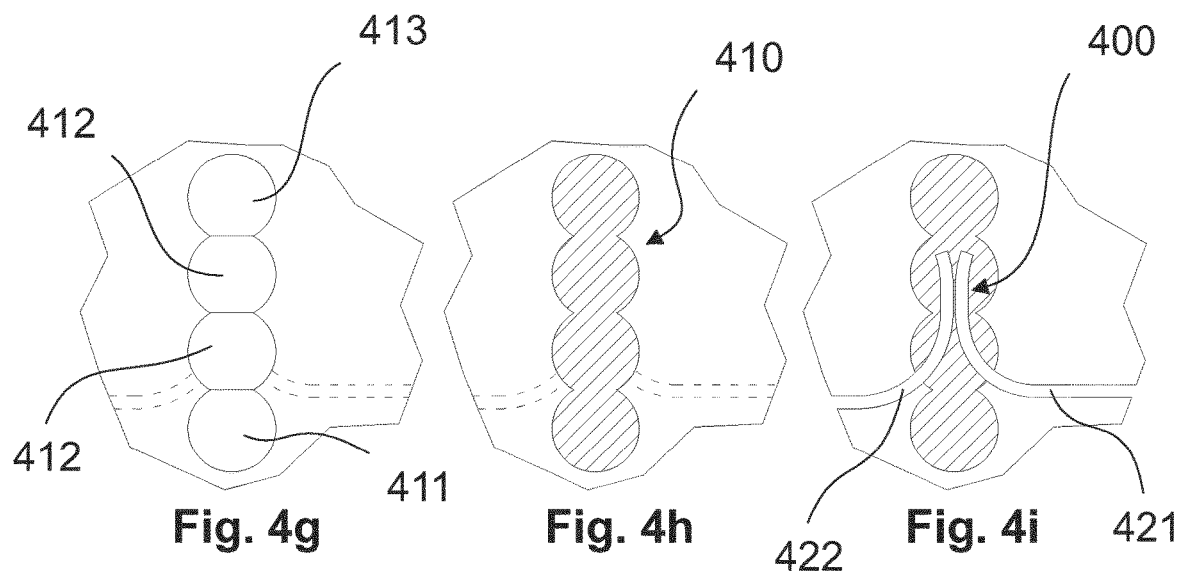

Fig. 6a
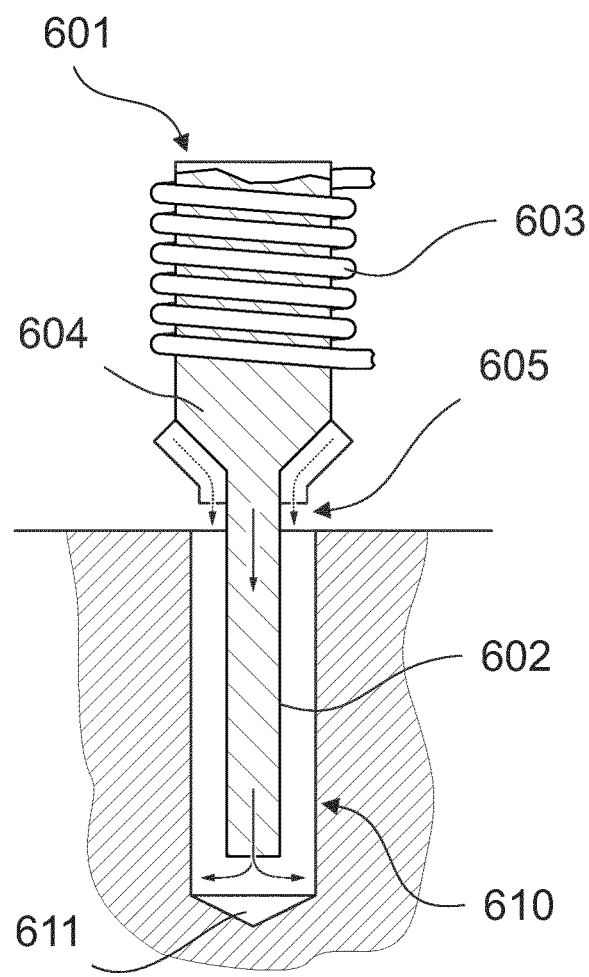
Fig. 6b
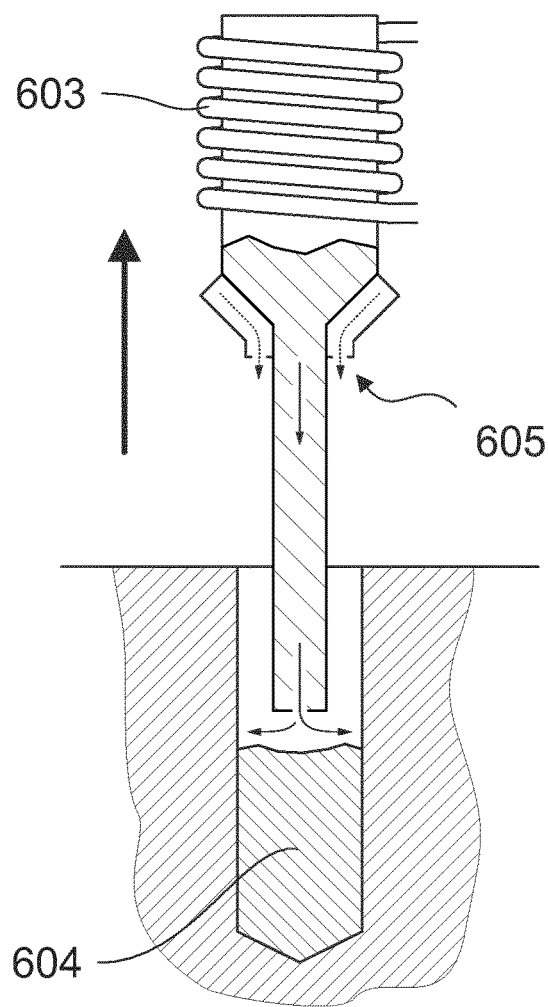
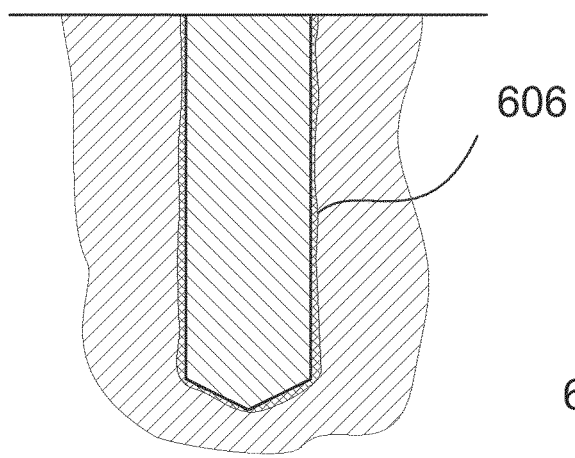
Fig. 7a
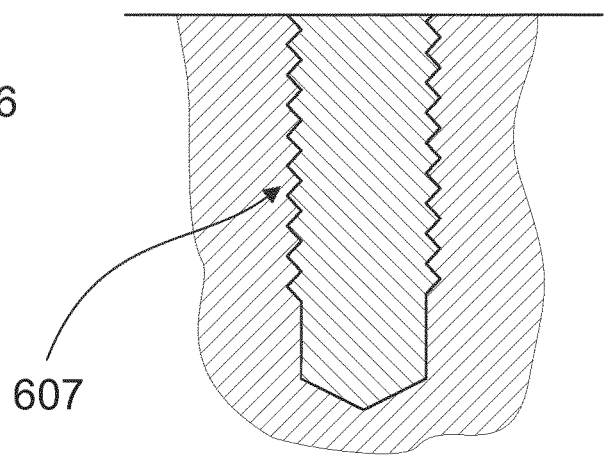
Fig. 7b

MONOLITHIC WEIGHING CELL WITH BEARINGS FORMED BY ADDITIVE MANUFACTURING

The invention relates to an at least partially monolithically constructed force transmission device having a parallel guide and a method for producing an at least partially monolithically constructed force transmission device having a parallel guide for a force measuring device, for example, a scale.

Known devices, for example, from EP 0 518 202 A1, of the type mentioned at the outset, which are integrally formed having a parallel guide for a force introduction part used for the force introduction of the force to be measured into the link of the force transmission lever, are advantageous above all because due to the integral formation, all assembly procedures for the mutual connection of the individual parts to one another by means of separately formed bending points are dispensed with. The pre-tensioning aging of the screw connections and the problems linked thereto are thus also dispensed with. Furthermore, because of the integral formation, the material properties are identical at all points of the device, so that errors induced due to different material properties are dispensed with.

The material of the integrally (monolithically) formed force transmission device determines, with properties such as the spring stiffness, the tension and pressure resistance, the modulus of elasticity, the temperature coefficient of the modulus of elasticity, the anelasticity (also known as creepage), and the linearity, the behavior of the thin-point flexional bearings—also called bending bearings or bearing points—of the parallel guide, the link, and the force transmission lever. The design of the bearing points in thickness and shape (cross section) and in the width (perpendicular to the cross section) is also dependent on the material used for the force transmission device. Accordingly, the bearing points substantially determine the power characteristic data of an analytic scale.

High-resolution low-load analysis scales and microscales require thin-point flexional bearings having the lowest possible spring stiffness, since the transmission ratio is small, and the restoring forces of the thin-point flexional bearings thus have greater influence on the force measurement. In other words, a lower spring stiffness of the thin-point flexional bearings results in better resolution of the cell. The spring stiffness of a thin-point flexional bearing is determined by the cross section and the modulus of elasticity of the material. The limits of the reliably manufactured mass production of present thin-point flexional bearings using a special aluminum alloy are at approximately 0.07 mm. This disadvantageously requires protection from damage upon the handling during production and assembly. The force transmission device is also to be protected by a large package of the scale and a transport safeguard during the transport of the finished scale to the customer.

In contrast to multipart force transmission devices, the material cannot be optimally adapted to the requirements for the functional task of a region of the force transmission device. A compromise thus always has to be found between the optimal material for the actual block, which forms the rigid parts, and the thin points, which movably connect the respective parts. A cost-effective material, which may be processed well by machine and thus shortens and simplifies the production, and which is minimally corrosion resistant, i.e., is not a high-quality finished material, is considered to be the ideal material for the block. Other properties are in turn required for thin points, which an ideal material has to combine in itself. On the one hand, a lower modulus of elasticity is to ensure that at equal strain upper limit, the cross section of a thin-point flexional bearing can be kept as small as possible (high tensile strength). It is also important that the temperature coefficient of the modulus of elasticity is equal to zero or is nearly zero, which means that the modulus of elasticity is characterized by its temperature independence. Common materials for the bearing points in multipart force transmission devices are copper-beryllium alloys or the material known under the tradename Thermelast 4002 of Vacuumschmelze GmbH & Co. KG.

One material of interest for the thin-point flexional bearings are bulk metallic glasses—abbreviated BMGs—or also called amorphous metals, a class of metal alloys, the microstructure of which is amorphous and noncrystalline. The crystalline nucleation and the nucleus growth are suppressed by rapid cooling of the molten alloys, and the amorphous structure is thus quasi-frozen in the solid state. BMGs typically have a higher hardness, strength, and corrosion resistance than conventional metals, with relatively low modulus of elasticity at the same time.

The company Liquidmetal Technologies, which primarily offers zirconium-based glasses, is a pioneer for the commercial utilization of amorphous metals. Further commercial suppliers are YKK and Advanced Metal Technology. Presently, amorphous metals are only applied in a few niche areas, in which high (wear) resistance and good corrosion properties are required. Examples of current applications are: housing parts for mobile telephones, scalpels, sporting equipment such as golf clubs and tennis racquets, pieces of jewelry, and watch cases.

The most recent developments in the field of processing technologies for amorphous metals, in particular in the case of the method for thermoplastic forming of amorphous metals, make it appear realistic that these materials can advantageously be employed for the use as elastic bearings for multipart load cells in analysis scales and microscales. An improved insensitivity to impact and overload, and also improved linearity and less load drift behavior, are to be expected due to the use of these materials in weighing cells. These bearings can replace the bending bearing elements used up to this point on multipart assembled force transmission devices, for example, as shown in DE 198 45 023 A1. A multipart load cell having elastic bearings made of amorphous material has heretofore not yet been placed on the market.

One goal of this invention is to make the material properties of the amorphous metals also usable for monolithic force transmission devices. In general, it is the goal of this invention to adapt the material at the bearing points and at the "block" independently of one another intentionally and to maintain the monolithic construction at the same time, whether the entire force transmission device or at least functional regions of the force transmission device are monolithically designed.

The problem is solved by means of a force transmission device having a parallel guide comprising a movable parallel leg, a fixed parallel leg, a first parallel guiding element, and a second parallel guiding element, wherein the parallel legs and the parallel guiding elements are connected to one another by thin-point flexional bearings, wherein the movable parallel leg is guided by the parallel guiding element on the fixed parallel leg, furthermore having a force transmission lever arranged on the fixed parallel leg, comprising a lever bearing, and a first lever arm, wherein the force transmission lever is pivotably mounted on the lever bearing and its first lever arm is connected in a force-transmitting manner to the movable parallel leg, wherein the force-transmitting connection is established by means of a coupling element having further thin-point flexional bearings, wherein the force transmission device or at least a functional region of the force transmission device is monolithically formed, and wherein a functional region of the force transmission device consists, in each case, of the first parallel guiding element, and/or the second parallel guiding element, and/or the force transmission lever, and/or the coupling element, and of the respective adjoining bearing points.

The invention is distinguished in that the force transmission device or at least one of the functional regions consists of at least one first material, and in that at least one of the bearing points of the force transmission device or the at least one functional region consists of a second material.

As already described above, a functional region consists of a functional element of the force transmission device, which has a defined function, for example, the upper parallel guiding element, which movably guides the movable parallel leg at a defined distance from the fixed parallel leg. Together with the lower parallel guiding element, these four elements form the parallelogram of the force transmission device. Each functional region furthermore consists of bearing points adjoining the functional element, which establish the connection to a closest functional element.

Bearing points are to be understood as the various aptly termed pivot points, which are provided on a force transmission device. The pivot points which define the parallelogram are frequently referred to as thin-point flexional bearings, and the pivot point at which the force transmission lever defines the transmission ratio is referred to as a lever bearing. Further bending bearings are the thin points in the force transmission between the movable parallel leg and the first lever arm of the force transmission lever. In one variant, the element interposed here also called a link is connected via two of said bending bearings to the movable parallel leg, on the one, and the first lever arm of the force transmission lever, on the other hand. In another variant, the movable parallel leg is directly connected via such a bending bearing to the first lever arm of the force transmission lever.

A force transmission device can be formed entirely monolithically or at least partially monolithically at its functional regions. Greatly varying possible combinations result in this case among the functional regions, so that, for example, a parallel guiding element can be formed monolithically together with the bearing points, which are then each attached by, for example, screw connections on the parallel legs. Another combination would consist of forming the entire parallelogram including the thin-point flexional bearings monolithically and installing the functional region of the force transmission lever as in a multipart force transmission device. Vice versa, the functional region of the force transmission lever may also be constructed monolithically, to then be installed in a parallelogram of a multipart force transmission device.

The invention results in an array of advantages. On the one hand, to meet the same requirements, the cross section of the bearing point can be adapted and/or reduced, which results in a reduction of the spring stiffness. A lower spring stiffness of the bearings results in better resolution of the cell.

Conversely, however, a uniform cross section would increase the robustness. An improved robustness or impact sensitivity of the cell due to more stable joint points, with equal cross section, offers more safety during the transport and reduces the packaging expenditure required for this purpose. Stated more simply, the design spectrum for the development of new weighing cell types is expanded.

In one refinement of the invention, the second material is at least partially embedded in the force transmission device or the functional region formed from the first material. In this meaning, "partially embedded" is to be understood to mean that the second material is partially enclosed in the first material in a protected or fitted manner, i.e., the second material is located or inserted in the surroundings or is incorporated or integrated into a larger whole.

In one refinement, at least one further bearing point is made of a further material. As already mentioned above, the goal of the invention is to adapt the materials at the bearing points and at the majority of the force transmission device to the requirements in a targeted manner. The best suitable material can thus be used at every bearing point.

One design is characterized in that the first parallel guiding element and/or the second parallel guiding element consist of the first material, and in that the thin-point flexional bearings consist of the second or the further material.

A further design is characterized in that the force transmission lever and/or the coupling element consist of the first material, and in that the lever bearing and/or the further thin-point flexional bearings of the coupling element consist of the second or the further material.

In one refinement, the second material and/or the further material is an amorphous metal. The amorphous metal is advantageously a compound based on zirconium-titanium. A compound based on zirconium-titanium is, for example, Zr—Ti—Cu—Ni—Be, Zr—Ti—Cu—Ni—Al, or Zr—Cu—Ni—Al—Nb. There are also amorphous metals based on manganese, copper (Cu—Ni—Co), based on iron (Fe—Co—Zr—Nb—B) or noble metals such as platinum (Pt—Cu—Ni—P). Furthermore, there are suitable compounds made of titanium and sulfur (Ti—S) and thus made of elements which occur very frequently on the earth and are industrially well usable, since the very light alloys made of titanium and sulfur are almost twice as strong as common metals based on titanium. In contrast to amorphous metals based on zirconium, palladium, or platinum, titanium is comparatively cost-effective, as is sulfur, which additionally does not have a highly toxic effect like the elements beryllium or phosphorus, which have heretofore frequently been used in such alloys. There are thus very many special alloys each having different properties. One can also presume that further alloys will be developed over time, which would be suitable as the second or further material on the basis of their properties. In general, amorphous metals are particularly well suitable because of their large linearity range, their high level of anelasticity, and their low level of hysteresis.

In one refinement, the contour of the recess is designed in such a way that the bearing point made of the second or the further material is arranged fastened by a form fit in the first material surrounding the second or the further material. Such a form fit can be achieved by the design of the recess, for example, by specially formed pockets being introduced into the first material, whether by milling, casting, or electrical discharge machining, for example.

In one further refinement, the shape of the at least one recess corresponds to at least three overlapping boreholes extending in parallel.

In one advantageous refinement, the alignment of the boreholes extends in parallel or perpendicularly to the thin-point flexional bearing of the parallel guide to be formed accordingly; the lever bearing of the force transmission lever; and/or the coupling element; and/or the thin-point flexional bearing of the coupling element. Furthermore, boreholes are also possible whose alignment extends at an angle differing from the orientation or perpendicular to the orientation of the thin-point flexional bearing to be formed, i.e., is inclined.

The force transmission device is produced by means of the method according to the invention for producing a monolithically formed force transmission device or at least one monolithically formed functional region of a force transmission device, wherein the force transmission device comprises a parallel guide having a movable parallel leg, a fixed parallel leg, a first parallel guiding element, and a second parallel guiding element, wherein the parallel legs and the parallel guiding elements are connected to one another by thin-point flexional bearings, wherein the movable parallel leg is guided by the parallel guiding elements on the fixed parallel leg, furthermore comprising a force transmission lever, arranged on the fixed parallel leg, having a lever bearing, and a first lever arm, wherein the force transmission lever is pivotably mounted on the lever bearing and its first lever arm is connected to the movable parallel leg in a force-transmitting manner, wherein the force-transmitting connection is established by means of a coupling element having at least one further thin-point flexional bearing, and wherein a functional region of the force transmission device consists, in each case, of the first parallel guiding element, or the second parallel guiding element, or the force transmission lever, and/or the coupling element, and respectively of the adjoining bearing points, comprising the following steps: A) providing a blank made of a first material; B) producing recesses on the provided blank at least at the points at which a bearing point comes to rest; C) filling up the produced recesses from step B using a second material; D) reworking the blank provided with filled recesses from step C by machine removal of the first and/or second material; and E) exposing the at least one bearing point at the points of the filled recesses in such a way that the force transmission device or at least the at least one functional region is formed from the first material and in such a way that the at least one bearing point of the force transmission device or the at least one functional region is formed from the second material.

The method according to the invention facilitates the production process for a force measuring device in that due to the selection of the ideal material for the "block", it can be machined faster. Less can also go wrong during the handling in the assembly thanks to the more robust bearing points, which reduces the number of discarded products.

The provision of the blank can also be performed by casting or extrusion. Steps A and B and/or C can also be carried out in combination, for example, the recesses already being produced during the casting or the second material being introduced simultaneously during the extrusion (two-component extrusion).

One refinement of the method is characterized in that a surface treatment in the region of the recesses is additionally performed between steps B and C. For example, this can be reworking of the cast blank, and/or etching (pickling) or coating of the surface, and/or an application of a microstructure. In general, the mechanical bond of the first material to the second and/or further material is improved in this way.

Another refinement of the method is characterized in that in step C, the recesses on the provided blank are filled using a prefinished component, wherein the component to be filled is additively manufactured, in particular is manufactured by means of laser beam melting in the powder bed method.

A further refinement of the method is characterized in that a posttreatment of the transition zone between two of the at least two materials is additionally performed between steps C and D. This can be carried out, for example, by local heat introduction (for example, by means of a laser), which ensures that an integral material bond results in the transition zone, or by means of a low-viscosity adhesive (for example, based on cyanide or curing under UV light), which creeps into possible intermediate spaces between the first material and the second or further material. The advantages result from a stable bond while simultaneously maintaining the special properties of the materials outside the transition zone, i.e., the glass temperature of BMG is not exceeded in the material and properties are maintained.

In a further refinement of the method, the recesses (210, 310, 410) are filled by casting, forming, or kneading.

Figure 1B:
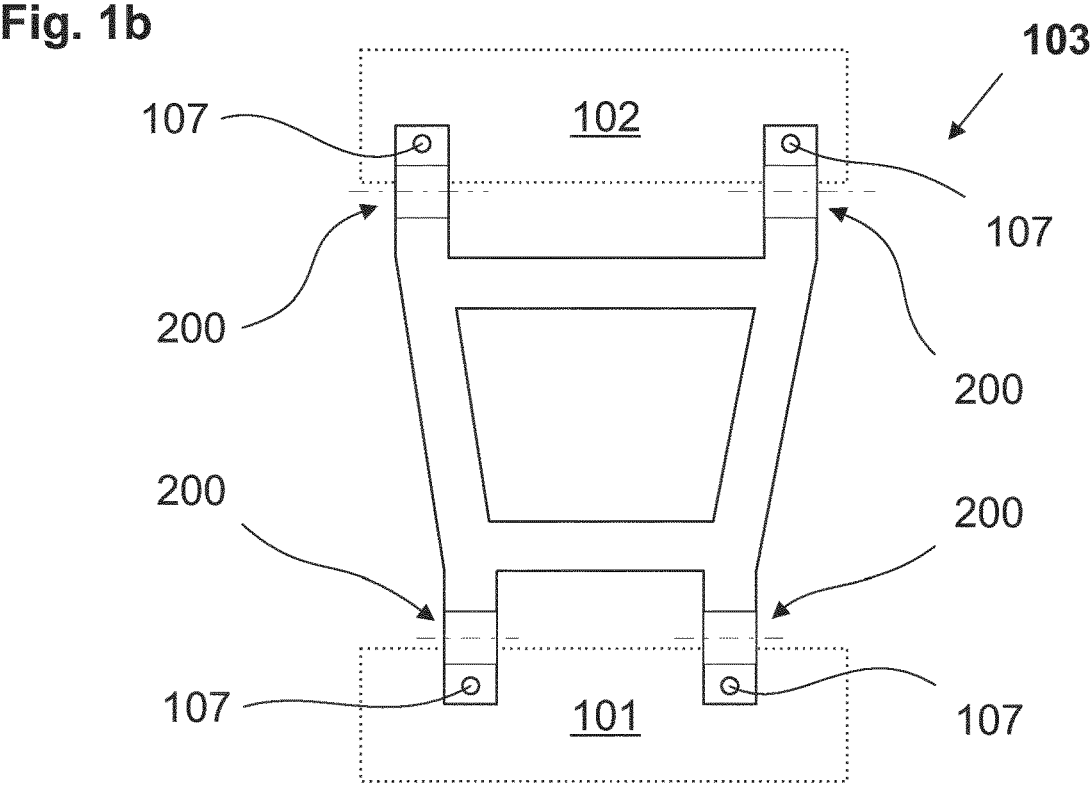
Figure 1C:
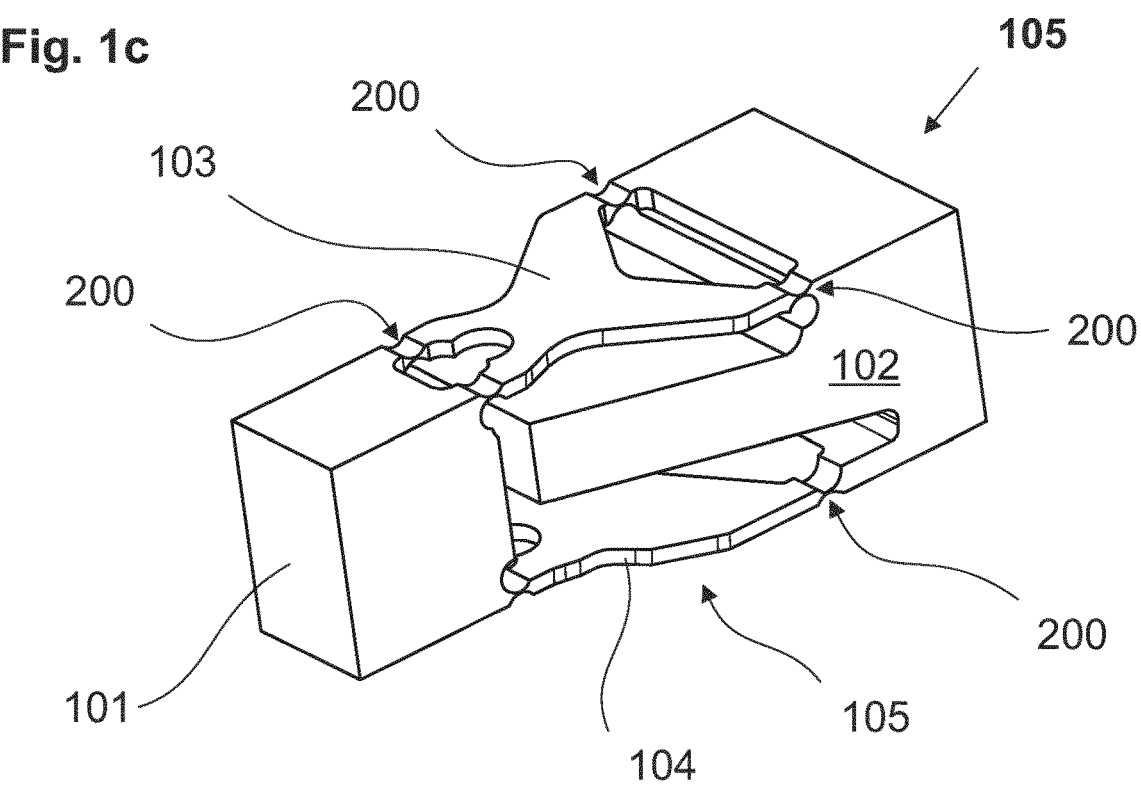
Figure 2A:
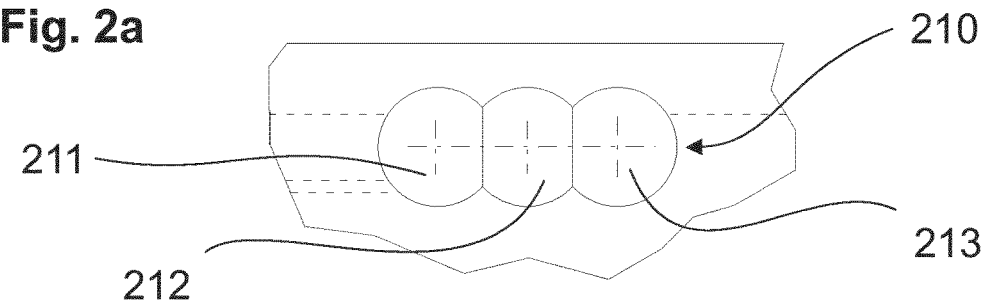
Figure 2B:
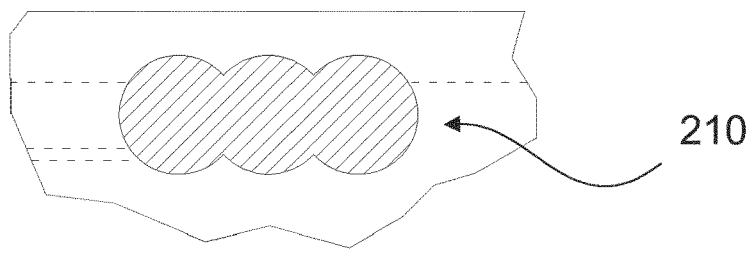
Figure 2C:
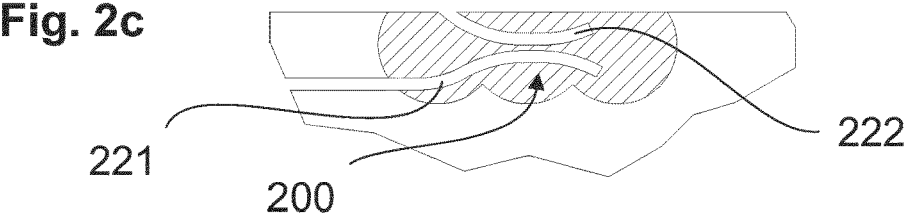
Figure 2G:
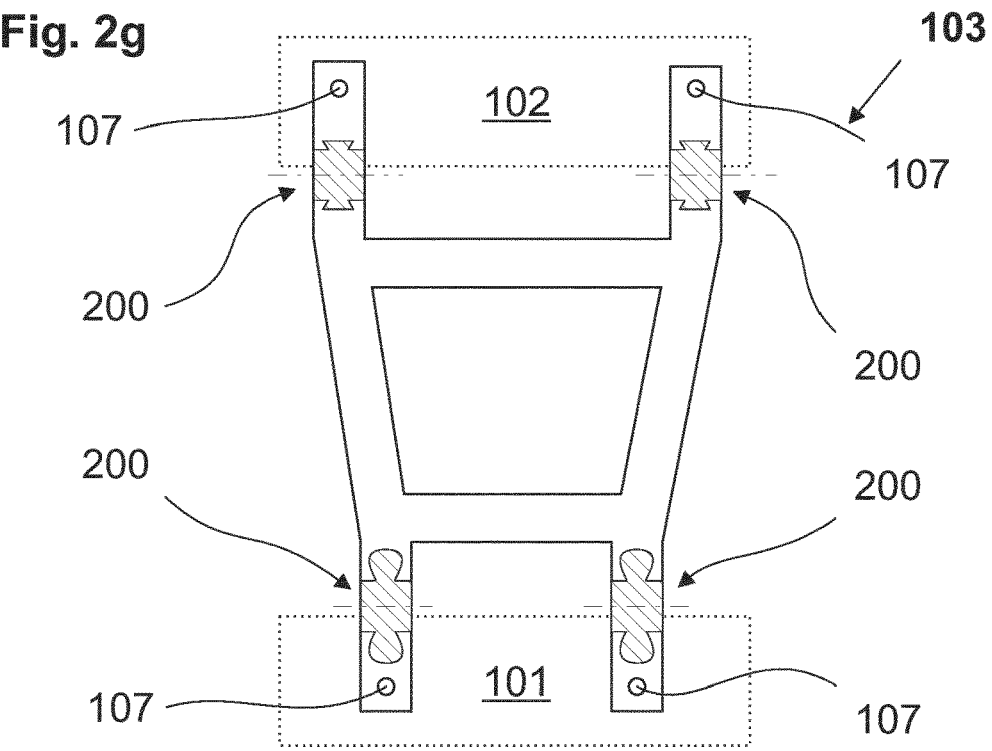
Figure 5A:
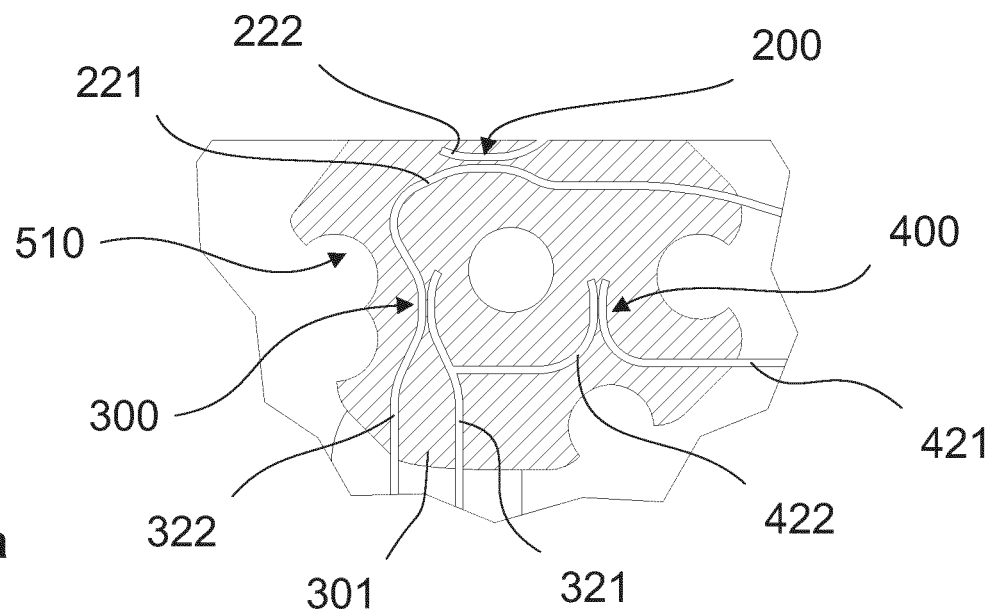
Figure 5B:
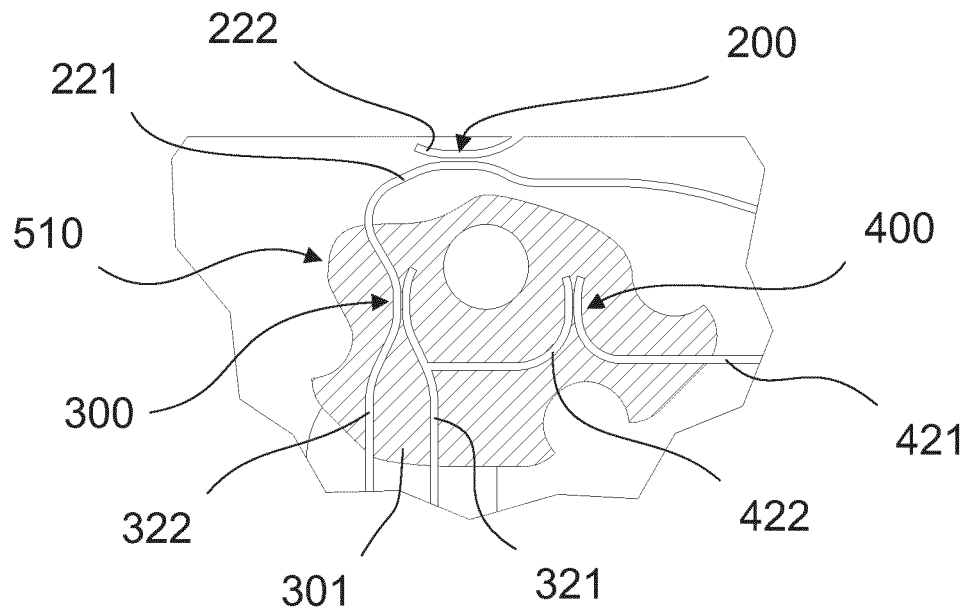

The force transmission device according to the invention is described in greater detail on the basis of the following figures, wherein identical elements are provided with the same reference signs. In the figures:

FIG. 1*a* shows a monolithic force transmission device in a side view;

FIG. 1*b* shows a monolithically formed parallel guiding element in a three-dimensional illustration;

FIG. 1*c* shows a monolithically formed parallelogram in a top view;

FIG. 2*a*-2*c* show details in the region of a parallelogram thin-point flexional bearing of the force transmission device from FIG. 1, having alignment of the boreholes extending in parallel to the thin-point flexional bearing;

FIG. 2*d*-2*f* show details in the region of a parallelogram thin-point flexional bearing of the force transmission device from FIG. 1, having alignment of the boreholes extending perpendicularly to the thin-point flexional bearing;

FIG. 2*g* shows the monolithically formed parallel guiding element from FIG. 1*b*, having material replaced at the bearing points;

FIG. 3*a*-3*f* show details in the region of the coupling element of the force transmission device from FIG. 1;

FIG. 4*a*-4*i* show details in the region of the lever bearing of the force transmission device from FIG. 1;

FIG. 5*a*-5*b* show details in the region of lever bearing/coupling element/thin-point flexional bearing of the force transmission device from FIG. 1;

FIG. 6*a*-6*b* show an injection device for filling recesses;

FIG. 7*a*-7*b* show a cross section through a filled recess.

FIG. 1*a* shows a known force transmission device 100 having a movable parallel leg 101 and a fixed parallel leg 102. The two parallel legs 101, 102 are connected to one another by a first parallel guiding element 103 and a second parallel guiding element 104 and are movably guided by thin-point flexional bearings 200. The parallel guide 105 (also called a parallelogram) thus formed of the force transmission device 100 made of one piece of the same material is also known as a monolithic construction.

Further elements of the force transmission device 100 are also monolithically formed in the same material block, for example, the coupling element 301 and its thin-point flexional bearing 300 and also the lever bearing 400 and the force transmission lever 401. All of these elements have been formed here in FIG. 1*a* by a wire erosion method, by the wire guiding being selected accordingly. The formation of these elements can also be performed by milling or electric discharge machining. Additional shaping procedures 106, as here in the region of the coupling element 301, effectuate narrowing in the width of the force transmission device 100. Such shaping procedures are also known in the region of the lever bearing 400 and the thin-point flexional bearing 200 of the parallel guide 105 to achieve certain mechanical advantages, which are dependent on predetermined masses solely due to the dimensioning of the shaping itself.

To also achieve mechanical advantages with regard to the material, it is proposed that the material at these points consist of a second material, which is different from the first material of the force transmission device 100.

As described in the introduction, amorphous metals are very well suitable for this purpose because of their material properties. In multipart force transmission devices, it is relatively simple to replace the material of the thin-point flexional bearings used up to this point with an amorphous metal, since it is a separate component. The integral construction or also monolithic construction is more complex by orders of magnitude in this regard and the implementation of a force transmission device 100 according to the invention from at least two different materials is all the more expensive in the production.

FIG. 1b shows a parallel guiding element 103 (could also be the parallel guiding element 104) as a monolithically formed functional region. A thin-point flexional bearing 200 is arranged in each case at the upper and lower ends on the parallel guiding element 103. The functional region is connected on each side respectively to the movable parallel leg 101 and the fixed parallel leg 102 by means of the fastening holes 107 (outlines shown by dashed lines).

In FIG. 1c, a monolithically designed parallel guide 105 is shown as a functional region, formed by the parallel legs 101 and 102, the parallel guiding elements 103 and 104, and by the thin-point flexional bearings 200.

A method for producing a monolithic force transmission device 100 is to be described on the basis of FIGS. 2a bis 2c. A blank, from which the finished force transmission device 100 will finally originate, is provided, i.e., cut to size, milled, or cast with respect to its external dimensions having possibly required excess. The above-mentioned shaping procedures 106 can also already be finished or produced with excess in this step, for example, as in the case of a blank produced by means of die casting methods.

As shown in FIG. 2a, firstly a recess 210 is produced, specifically here at least at the points at which a thin-point flexional bearing 200 of the parallel guide 105 comes to rest. In FIG. 2a, this recess 210 is formed by three overlapping boreholes 211, 212, 213 located in identical alignment.

The previously produced recess 210 is thereupon filled using the second material. One possible method for filling the recess 210 is described hereafter with respect to FIGS. 6a and 6b. The finished introduced second material in the recess 210 is shown highlighted by the shading in FIG. 2b.

The connecting points characteristic for the integral construction, or also material bridges in the region of the thin-point flexional bearings 200 of the parallel guide 105 here are processed after completed filling. The formation of the joint point of the thin-point flexional bearing 200, or also called exposure, can be carried out by wire erosion, electric discharge machining, ECM (Electro Chemical Machining), or milling and/or high-speed milling. In FIG. 2c, the thin-point flexional bearing 200 has been formed by wire erosion, recognizable at the separating cuts 221, 222. These separating cuts are shown by dashed lines in FIGS. 2a and 2b. The material required for the production of a recess 210 around the recess 210 itself can also be removed.

The recess 210 can be formed in different shapes, as long as it is capable of withstanding the effects occurring during the use of the force transmission device, i.e., that the second material is held in position with sufficient strength.

Another option and/or positioning for producing a recess for the thin-point flexional bearing 200 is shown in FIGS. 2d to 2f. While in FIGS. 2a to 2c, the three boreholes 211, 212, 213 extend in parallel to the separating cuts 221 and 222, the boreholes 211', 212', 213' in FIGS. 2c to 2f extend perpendicularly to the separating cuts 221, 222. Each of the three FIGS. 2d to 2f consists of two partial figures a top view and a side view. It can be seen well in this option that the point of the thin-point flexional bearing 200 requires an excess 230, so that the recess 210' is enclosed all around by the first material of the force transmission device 100. After the filling, this excess 230 is removed during the exposure and the thin-point flexional bearing 200 receives its final form.

In the case of material pairings between the materials, the possibility exists that melting, mixing, or bonding does not occur at the material boundaries, i.e., a material bond (integral bond) does not result, so that detachment of the filled material can occur very rapidly. In this case, the shape of the recess 210, 210' is decisive, so that a form fit results. Depending on the action direction of the occurring forces in the region which was replaced by the second or the further material, the alignment of the recess is decisive. Not only the directions of the boreholes 211, 212, 213, 211', 212', 213' have influence on the suitability, but rather also further embodiments having threaded boreholes are sometimes advantageous, since these provide an enlarged contact surface. It is also to be noted here that microstructures on the surface itself are also suitable for enlarging the contact surface.

The monolithically formed parallel guiding element 103 from FIG. 1b, having replaced material at the bearing points 200 (shaded), is shown in FIG. 2g. A form fit results due to special contouring at the material boundaries between the first material of the parallel guiding element 103 and the second or further material of the bearing points 200. This functional region can be produced, for example, by providing a plate corresponding to the thickness of the parallel guiding element 103 as a blank in a first step. Next, recesses are produced in the plate, which are filled using the second or the further material, after possible pre-treatments. Finally, the final shape of the parallel guiding element 103 can then be cut out, stamped, or milled.

In FIGS. 3a to 3c and 3d to 3f, the above-described steps for producing a monolithic force transmission device 100 are shown at the point of the coupling element 301 and the further thin-point flexional bearing 300 of the coupling element 301. The positioning of a recess 310 in two options is again shown; once in that the alignment of the boreholes 311, 312, 313 extends perpendicularly to the separating cuts 321 and 322 in FIGS. 3a to 3c, and once in that the alignment of the boreholes 311, 312, 313 extends in parallel to the separating cuts 321, 322 in FIGS. 3d to 3f.

In FIGS. 4a to 4c, 4d to 4f, and 4g to 4i, the above-described steps for producing a monolithic force transmission device 100 are shown at the point of the lever bearing 400. An illustration of further positions in relation to the separating cuts 421, 422 is omitted in this case and reference is made to the preceding description with respect to FIGS. 2a to 2f and 3a to f, since these can also be applied at the point of the lever bearing 400. In addition, a formation of the recess 410 having four boreholes 411, 412, 413, 414 is shown on the basis of the example of the lever bearing 400. The position of the boreholes is selected in such a way that the most optimum possible form fit results.

It is obvious to replace not only the first material at one point, but rather to combine multiple bearing points 200, 300, 400, whereby a variety of possible combinations results. Depending on the requirement profile for the monolithic force transmission device 100, for example, only the first material for the thin-point flexional bearing 200 of the parallel guide 105 is replaced, or only the first material of the lever bearing 400 of the force transmission lever 401, etc., or only the first material of all bearing points 200, 300, 400 is replaced.

FIGS. 5a and 5b each show a recess 510 which simultaneously connects multiple points for the replacement of the first material to one another in one recess. The distances to one another are relatively short in the region of the lever bearing 400, the bending points 300 of the coupling element 301, and the thin-point flexional bearing 200 of the upper parallel guiding element 103, and one single recess 510 for the bearing points 200, 300, 400 requires at least the second material for filling. An outline-optimized shape and/or contour of the recess 510 offers improved anchoring, i.e., a better form fit.

In the case of larger step-down ratios of the weight force to be measured, the lever bearing 400 and the thin-point flexional bearing 300 of the coupling element 301 are closer together or a multi-lever system is used, i.e., a further force transmission lever is applied at the second lever arm 403 (shown in FIG. 1a). Therefore, replacing the first material at these points, and combining them with other points where possible, also suggests itself.

FIGS. 6a and 6b show a possible method for filling the recesses 210, 310, 410, 510 by means of an induction syringe 601. After a recess 610 has been produced, as a borehole 611 here, the cannula 602 of the induction syringe 601 is introduced into the recess 610. The material 604 to be filled is held at induction temperature by an induction coil 603. As shown in FIG. 6b, the filling is then performed by injecting the second material while simultaneously retracting the cannula 602. To avoid a reaction of the material 604 to be filled with the surroundings, a protective gas can additionally be blown in, for example, through a ring opening 605. Under certain circumstances, it can be advisable to have the entire procedure take place under protective gas atmosphere or in partial or full vacuum.

Further FIGS. 7a and 7b illustrate that the solid bond between the first material and the second and/or the further material can be improved by targeted measures. On the one hand, the possibility exists of treating the contact surface between the two materials prior to the filling, for example, by etching (pickling) or an application of a coating or a microstructure. The result is a transition zone 606 between the two materials. On the other hand, the contact surface can also be increased by targeted shaping, for example, by threads 607 in the borehole 611.

A further possible method for filling the recesses 210, as are shown, for example, in FIG. 2g, includes forming the second or the further material by kneading. A blank is firstly heated to a temperature in this case, so that the special material properties are not destroyed, but a deformation by force introduction becomes possible. The heated blank is placed on a cavity, for example, a recess in the blank made of the first material, and pressed therein by means of a stamp, which executes tumbling movements and moves toward the cavity. An orbital forming press is typically used for this purpose. Such forming processes are advantageous under certain circumstances because the material can be provided as a blank easily, working with amorphous materials below the glass transition temperature is possible, and high process forces ensure a good formfitting connection between two materials.

Another possible method for filling the recesses 210, 310, 410, 510, 610, as are shown, for example, in FIGS. 2a, 2d, 3a, 3d, 4a, 4d, 4g, 5a, 5b, and 6a, includes the use of a prefinished component, wherein the component to be filled is additively manufactured, for example, by means of laser beam melting in the powder bed method.

Additive or generative refers to manufacturing processes which produce components layer-by-layer from metals, polymers, or special materials by layered buildup. In the case of the so-called powder bed method, layers of a powder having typical particle sizes of 10-100 μm are applied to a construction platform and the cross section of the component to be produced is melted via laser (selective laser melting) or electron beam (selective electron beam melting) and welded to component layers located underneath. In this manner, extremely complex structures may be produced from a variety of materials layer-by-layer. Restrictions of manufacturing-suitable design for classic manufacturing methods no longer apply here, since transitions, undercuts, or cavities can also be produced without tools.

The melting of only thin powder layers necessarily results in very high cooling rates, which ensure the required cooling rates for producing metallic glasses. In the literature, achievable cooling rates of $4\times10^4$ K/s to $5\times10^6$ K/s are reported. Modern specially developed, glass-forming alloy systems already solidify amorphously at cooling rates $<10^2$ K/s. The high power density of modern laser systems with small focus diameters at the same time furthermore permits rapid and precise melting of powder layers or component surfaces. Complex thin-walled components may be produced in this way, which cannot be implemented by casting.

Moreover, not only thin components or components only a few millimeters in size may be produced by the generative construction of individual layers, but rather also macroscopically larger components, the dimensions of which even exceed the component sizes producible by means of casting methods. Beyond the above-mentioned advantages in comparison to conventional production methods for producing metallic glasses, however, it is also necessary to master certain method-related challenges in 3D printing. One example is the heat introduction into the material. To ensure an amorphous structural state, the heat introduced by means of laser/electron beam has to be effectively dissipated. This predominantly takes place through the component itself due to the layered structure, i.e., along the previously produced layers located underneath. In the course of the production of components, the individual layers thus experience an accumulated heat introduction, which can in turn result in crystallization and thus a loss of the properties characteristic for the amorphous state.

The production of amorphous components accordingly requires knowledge of the thermophysical properties of the alloys and necessitates an adaptation of the process control to the thermal stability of the material. Moreover, high demands are also placed on the powder properties. The production of smooth and dense powder layers presumes a certain fluidity of the powder, which is substantially given by shape and size distribution of the particles, in addition to influences such as the humidity, for example. The quality of the powder bed is decisive for the resulting material properties (for example, porosity) and thus in turn has an effect on the mechanical properties of the components.

Although the figures shown here in conjunction with the invention predominantly show MFR force transmission devices, the applicability is naturally also provided for force transmission devices which make use of the strain gauge technology. The invention is also not restricted to force transmission devices having only one force transmission lever, but rather those devices having two or more force transmission levers for the further stepping down of the weight force to be weighed are also design variants of this invention.

LIST OF REFERENCE NUMERALS 100 force transmission device
101 movable parallel leg
102 fixed parallel leg
103 first parallel guiding element
104 second parallel guiding element
105 parallel guide
106 additional shaping procedure
107 fastening holes
200, 300, 400 bearing points
200 thin-point flexional bearing
210, 310, 410, 510, 610 recess
211, 212, 213, 311, 312, 313, 411, 412, 413, 414, 611 borehole
221, 222, 321, 322, 421, 422 separating cut
230 excess
300 thin-point flexional bearing of the coupling element
301 coupling element
400 lever bearing
401 force transmission lever
402 first lever arm
403 second lever arm
601 induction syringe
602 cannula
603 induction coil
604 material to be filled
605 ring opening
606 transition zone
607 threads

The invention claimed is:

1. A force transmission device, comprising:
a parallel guide having a movable parallel leg, a fixed parallel leg, a first and a second parallel guiding element, with thin-point flexional bearings that connect the parallel legs by way of the parallel guiding elements, such that the movable parallel leg is guided by the parallel guiding elements on the fixed parallel leg; and
a force transmission lever, arranged on the fixed parallel leg, comprising a lever bearing, and a first lever arm, such that the force transmission lever is pivotably mounted on the lever bearing and a coupling element with at least one further thin-point flexional bearing provides the first lever arm with a force-transmitting connection to the movable parallel leg
wherein the force transmission device or at least one functional region of the force transmission device is formed monolithically, with the force transmission device or at least one of the functional regions comprising at least one first material, with at least one of the thin-point flexional bearings of the force transmission device or the at least one functional region comprising a second material, and
wherein each of the at least one functional regions comprises a combination of:
at least one of: the first parallel guiding element, the second parallel guiding element, and/or the force transmission lever, and the coupling element, with
at least one of the thin-point flexional bearings that is adjoining.

2. The force transmission device of claim 1, wherein the second material is at least partially embedded in at least one recess of the force transmission device, formed from the first material, or the at least one functional region.

3. The force transmission device of claim 1, wherein at least one further thin-point flexional bearing consists of a further material.

4. The force transmission device of claim 1, wherein at least one of the parallel guiding elements consists of the first material, and the thin-point flexional bearings consist of the second material.

5. The force transmission device of claim 1, wherein at least one of the force transmission lever and the coupling element consists of the first material, and at least one of the lever bearing and the further thin-point flexional bearings of the coupling element consist of the second material.

6. The force transmission device of claim 1, wherein the second material is an amorphous metal.

7. The force transmission device according to claim 2, wherein the contour of the recess is designed in such a way that the thin-point flexional bearing made of the second or the further material is arranged so as to be fastened by a form fit in the first material.

8. The force transmission device according to claim 7, wherein the shape of at least one recess corresponds to at least three overlapping boreholes extending in parallel.

9. The force transmission device claim 8, wherein the boreholes are aligned to extend in parallel or perpendicularly to at least one of:
the thin-point flexional bearing of the parallel guide;
the lever bearing of the force transmission lever;
the coupling element; and
the thin-point flexional bearing of the coupling element to be formed correspondingly.

10. A method for producing a monolithically formed force transmission device or at least one monolithically formed functional region thereof, wherein the force transmission device comprises a parallel guide having a movable parallel leg, a fixed parallel leg, a first parallel guiding element, and a second parallel guiding element, wherein the parallel legs and the parallel guiding elements are connected to one another by thin-point flexional bearings, wherein the movable parallel leg is guided by the parallel guiding elements on the fixed parallel leg, and a force transmission lever, arranged on the fixed parallel leg, having a lever bearing, and a first lever arm, wherein the force transmission lever is pivotably mounted on the lever bearing and the first lever arm thereof is connected to the movable parallel leg in a force-transmitting manner, wherein the force-transmitting connection is produced by means of a coupling element having at least one further thin-point flexional bearing, and wherein each of the at least one functional regions comprises a combination of: at least one of: the first parallel guiding element, the second parallel guiding element, the force transmission lever, and the coupling element, with at least one of the thin-point flexional bearings that is adjoining the method comprising the steps of:
A) providing a blank made of a first material;
B) producing recesses on the provided blank at least at the points at which a thin-point flexional bearing comes to rest;

C) filling the produced recesses from step B using a second material;

D) reworking the blank provided with filled recesses from step C by machine removal of the first and/or second material; and E) exposing the at least one thin-point flexional bearing at the points of the filled recesses in such a way that the force transmission device or at least the at least one functional region made of the first material is formed, and in such a way that the at least one thin-point flexional bearing of the force transmission device or of the at least one functional region made of the second material is formed.

11. The method according to claim 10, wherein a surface treatment is performed in the region of the recesses during or between steps B and C.

12. The method according to claim 10, wherein in step C, the recesses on the provided blank are filled using a prefinished component, in particular the component to be filled is additively manufactured, in particular the component is manufactured by means of laser beam melting in the powder bed method.

13. The method according to claim 10, wherein a posttreatment of the transition zone between two of the at least two materials is performed between steps C and D.

14. The method according to claim 10, wherein the recesses are filled in step C by casting, forming or kneading.

15. The method according to claim 11, wherein the surface treatment is an etching (pickling) and/or coating of the surface, and/or an application of a microstructure.

16. The method according to claim 13, wherein the posttreatment of the transition zone is a local heat introduction, for example by means of a laser, which ensures that an integrally joined material bond results in the transition zone, or in that the posttreatment is an application of a low-viscosity adhesive, which penetrates into possible intermediate spaces between the first material and the second or further material.

17. The force transmission device of claim 6, wherein the amorphous metal is a compound based on zirconium and titanium.

18. The method according to claim 11, wherein a posttreatment of the transition zone between two of the at least two materials is performed between steps C and D.

* * * * *

UNITED STATES PATENT AND TRADEMARK OFFICE
CERTIFICATE OF CORRECTION

PATENT NO. : 11,892,342 B2
APPLICATION NO. : 16/955849
DATED : February 6, 2024
INVENTOR(S) : Burisch et al.

It is certified that error appears in the above-identified patent and that said Letters Patent is hereby corrected as shown below:

In the Specification

In Column 3, Line 35, please delete "here also called a link is" and insert -- here - also called a link - is --.

In Column 7, Line 53, please delete "bridges in the region of the thin-point flexional bearings 200 of the parallel guide 105 here are" and insert -- bridges - in the region of the thin-point flexional bearings 200 of the parallel guide 105 here - are --.

In Column 8, Line 9, please delete "figures a" and insert -- figures - a --.

In the Claims

In Column 12, Line 4, Claim 1, please delete "and/or".

In Column 12, Line 12, Claim 3, please delete "device of claim 1" and insert -- device of claim 2 --.

Signed and Sealed this
Twenty-third Day of April, 2024

*Katherine Kelly Vidal*

Katherine Kelly Vidal
*Director of the United States Patent and Trademark Office*